March 17, 1931.  H. R. RICARDO  1,796,896
FLUID PRESSURE ENGINE OF THE SLEEVE VALVE TYPE
Filed May 28, 1927    3 Sheets-Sheet 1

INVENTOR
By Harry R. Ricardo,
Watson, Coit, Morse & Grindle,
ATTY'S

Patented Mar. 17, 1931

1,796,896

UNITED STATES PATENT OFFICE

HARRY RALPH RICARDO, OF LONDON, ENGLAND

FLUID-PRESSURE ENGINE OF THE SLEEVE-VALVE TYPE

Application filed May 28, 1927, Serial No. 195,002, and in Great Britain July 24, 1926.

This invention relates to fluid pressure engines of the single sleeve valve type, that is to say the type in which a single sleeve valve moving within each cylinder controls ports in the wall thereof. The object of the invention is to provide an improved arrangement of operating mechanism for the sleeves in such engines of the kind in which the sleeves in an adjacent pair of cylinders each have a combined oscillating and reciprocating motion imparted thereto by a common rotary member mounted in bearings disposed between and carried by the cylinders in which such sleeves operate and driven from a lay shaft operatively connected to the crank shaft.

In such engines as previously proposed the lay shaft was supported in bearings in the crank case with the result that, when the cylinder block and sleeves were removed, each sleeve had to be retimed correctly on the cylinder block being replaced, this being a difficult and lengthy operation to perform.

According to the present invention the lay shaft which serves to drive the rotary sleeve operating members is mounted in bearings supported in the cylinder block so that the cylinder block, sleeve valves and valve operating mechanism can be removed as a unit from the crank case when it is desired to examine the pistons or for other purposes.

In this way when the cylinder block and sleeve valves are removed, the sleeve valves remain correctly timed relatively to one another so that when the cylinder block is replaced it is only necessary to time the lay shaft correctly in relation to the crank shaft and all the sleeve valves will be automatically retimed correctly.

The lay shaft is preferably driven either directly or indirectly fom the crank shaft through two or more coupling rods engaging cranks or eccentrics on the lay shaft and on the crank shaft or other member from which the lay shaft is driven. In this way the timing of the lay shaft and hence of all the sleeve valves is automatically set correctly when the coupling rods are connected up, thus obviating incorrect timing of the lay shaft.

The invention may be applied to engines having either a single row of cylinders or having two or more rows arranged at an angle to one another and each supporting a lay shaft from which the rotary sleeve operating members for such cylinder row are driven.

The invention may be carried into practice in various ways but one construction according to this invention is illustrated by way of example in the accompanying drawings, in which Figure 1 is a sectional elevation, the section being taken through the axis of one of the cylinder bores.

In the construction illustrated the engine comprises a crank case A having bearings therein supporting a crank shaft B. Removably mounted on the crank case and secured thereto for example by bolts $C^1$ is a water cooled cylinder block C. The cylinder block may for example have four or six cylinder bores and each bore contains a sleeve valve D controlling inlet and exhaust ports $C^2$, $C^3$ in the cylinder wall. The sleeves are adapted to be operated from rotary members E mounted in bearings $E^1$ supported by or formed in the cylinder block C, these bearings conveniently being formed in two parts the lower of which is held in position by bolts or the like $E^2$. One or more of the rotary sleeve operating members E is disposed between two adjacent cylinders and operates the sleeve valves in the cylinders on each side of it. The rotary sleeve operating members E are adapted to rotate about axes parallel to the crank shaft as shown and are conveniently in the form of short rotatable drums or discs each connected to the sleeve or sleeves which it operates through a flexible coupling comprising for example a spherical joint G engaged by a pin $G^1$ on the sleeve, whereby rotation of the rotary members E will impart to the sleeves a combined oscilating and reciprocating motion in known manner.

Figure 1:
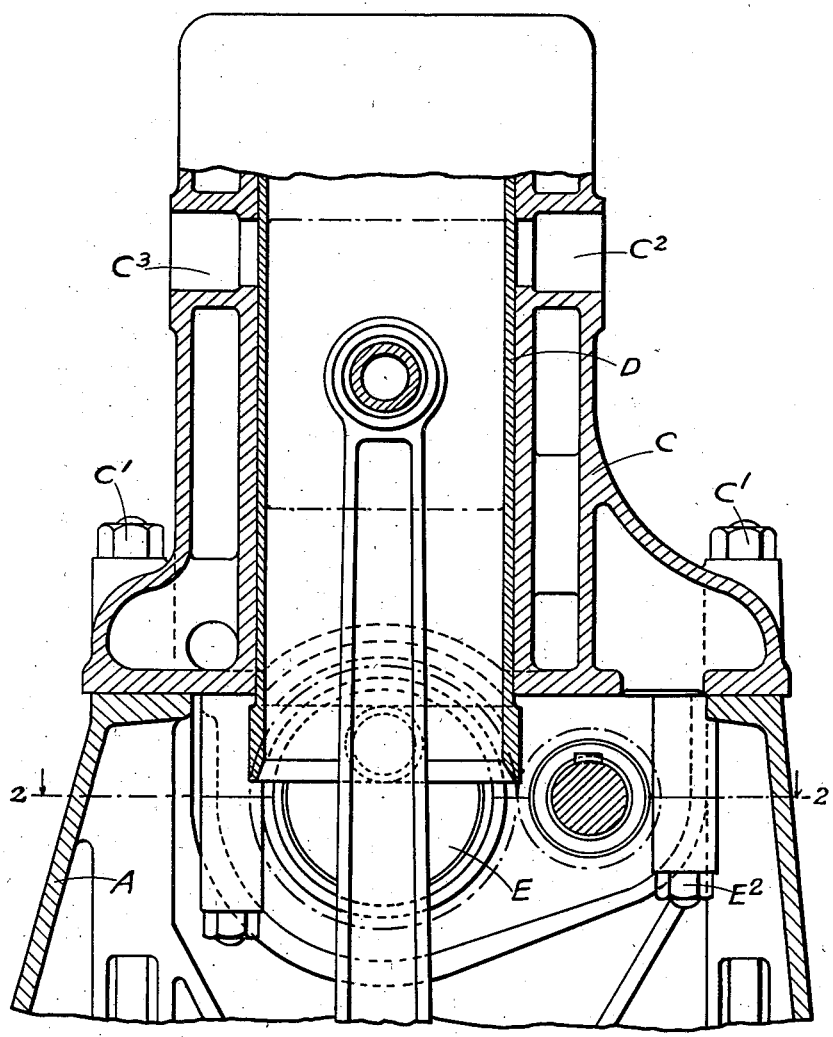
Figure 2:
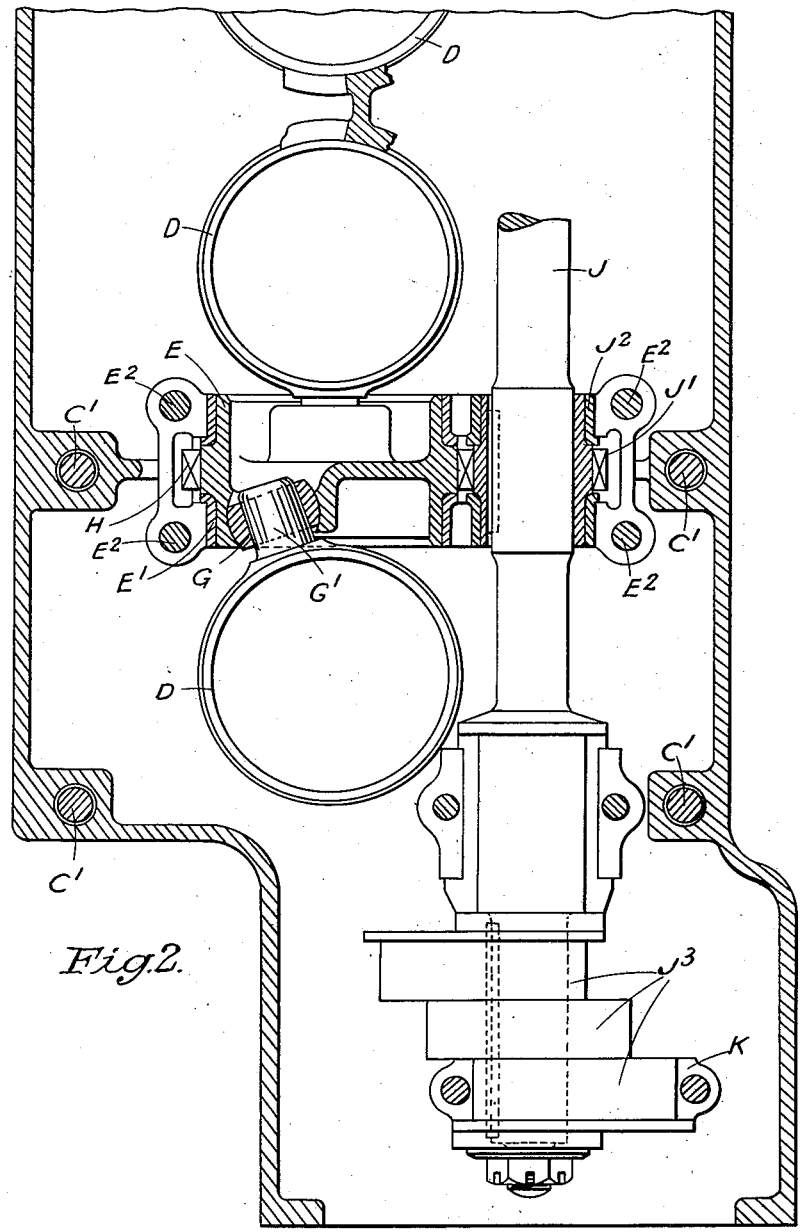
Figure 2 is a section on the line 2—2 of Figure 1.
Figure 3:
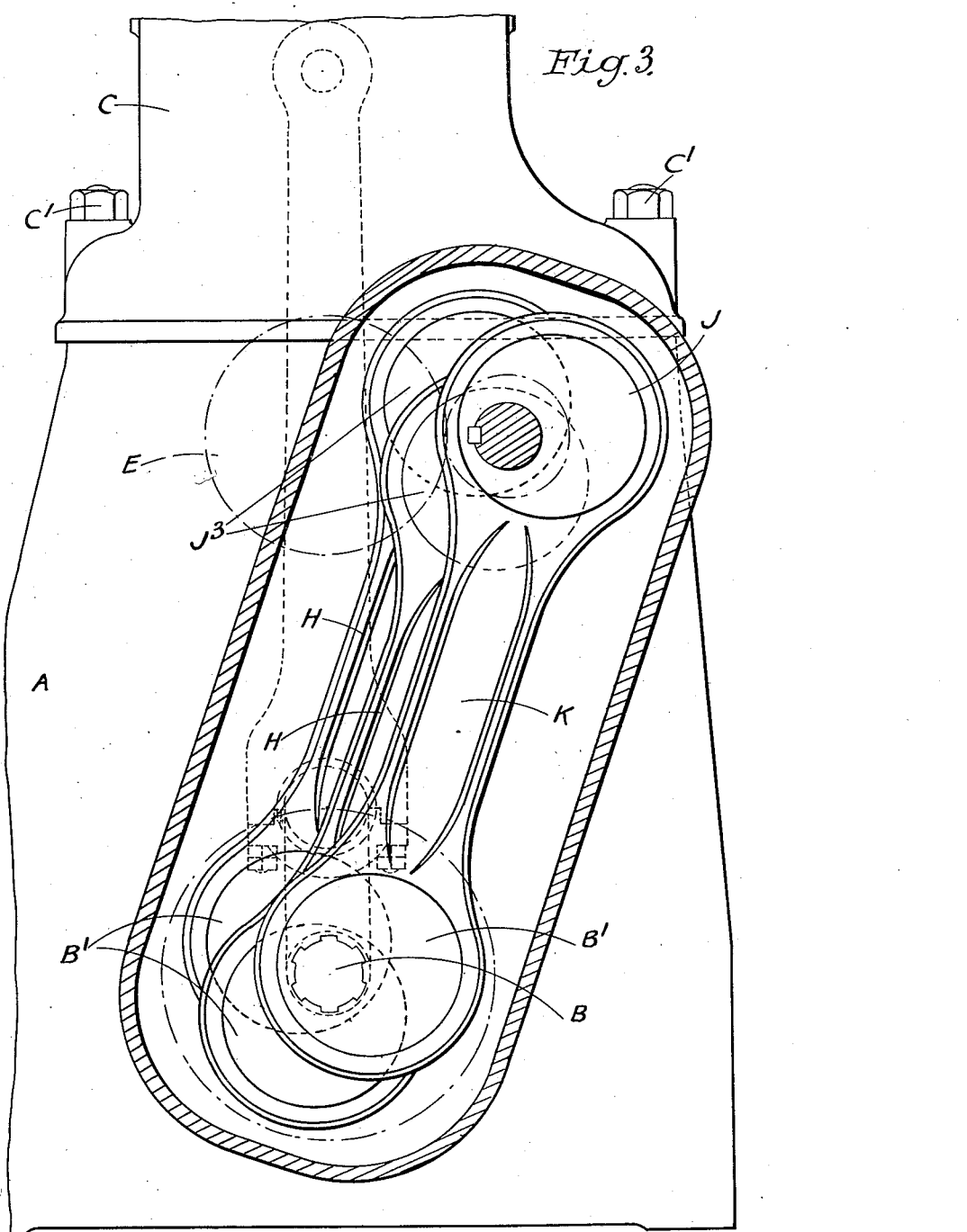
Figure 3 is an end elevation partly in section showing how the drive is transmitted from the crank shaft to the lay shaft.

Each of the rotary sleeve operating members E carries or is formed at its circumference as a gear wheel H meshing with a gear wheel $J^1$ mounted on a lay shaft J carried in bearings $J^2$ formed in or supported by the cylinder block C, the lower half of each of these bearings for example being formed integral with the lower half of one of the bearings $E^1$ and also held in position by the bolts $E^2$. The lay shaft J is adapted to be driven from the engine crank shaft through two or more, for example three, coupling rods K engaging eccentrics $J^3$ and $B^1$ respectively on the lay shaft J and crank shaft B as shown in Figure 3, these eccentrics being angularly displaced from one another so as to eliminate any risk of the mechanism jamming through the eccentrics all simultaneously being on their dead centres.

Where the engine is of the four cylinder type, two rotary valve operating members may be provided, one disposed between and operating the sleeves in cylinders 1 and 2 and the other disposed between and operating the sleeves in cylinders 3 and 4 although in some cases it may be preferable to provide three rotary members one of which is disposed between and operates the sleeves in cylinders 2 and 3 while each of the others operates a sleeve in one of the other two cylinders. With the latter arrangement the rotary sleeve operating members will be disposed substantially directly over the crank shaft bearings and will thus make the engine of a more compact construction.

Where the invention is applied to an engine of the six cylinder type either three rotary members may be provided each operating the sleeves in two of the cylinders or alternatively, four rotary sleeve operating members may be provided, one operating the sleeves in cylinders 2 and 3, another those in cylinders 4 and 5 while cylinders 1 and 6 are each operated by a rotary member disposed substantially directly over the end crank shaft bearings. In this case the rotary members for operating the sleeves in cylinders 2 and 3 and in cylinders 4 and 5 will also be disposed substantially directly over the intermediate crank shaft bearings thus rendering the construction more compact.

Where the lay shaft is driven through coupling rods as in the construction illustrated the bearings at one or both ends of these rods may be formed in two halves so as to enable such rods to be readily disconnected when it is desired to remove the cylinder block with the sleeves, rotary sleeve operating members and lay shaft from the crank case.

It will be seen that with an engine according to this invention when the cylinder block is removed and replaced the timing of the valves in relation to one another remains unaltered so that in replacing the block it is only necessary to time the lay shaft correctly in relation to the crank shaft and the timing of all the valves will automatically be correct. Further where a coupling rod drive is provided for the lay shaft it is impossible to time this shaft incorrectly.

It is to be understood that the invention is not limited to engines of the four or six cylinder type or to engines having one row of cylinders but may be applied to engines having one or more cylinder rows and two or more cylinders in each row while, although a coupling rod drive is preferred for the lay shaft, some other form of drive may be substituted therefor where convenient. Further, the drive may be transmitted from the lay shaft to the rotary sleeve operating members through chains instead of through gear wheels if desired and other modifications made without departing from this invention.

What I claim as my invention and desire to secure by Letters Patent is:—

1. A multi-cylinder fluid pressure engine of the sleeve valve type including in combination a crank case, a crank shaft, a block of cylinders detachably mounted on the crank case, a sleeve valve in each cylinder, at least one rotary member disposed between two adjacent cylinders, bearings supported on the cylinder block carrying each rotary member, an operative connection between each rotary member and the sleeves in the two adjacent cylinders whereby a combined oscillating and reciprocating motion is imparted to these sleeves, a lay shaft, bearings supported on the cylinder block carrying the lay shaft, and operative driving connections between the lay shaft and each rotary member and between the lay shaft and the crank shaft.

2. A multi-cylinder fluid pressure engine of the sleeve valve type including in combination a cylinder block having a pair of cylinders formed therein, a sleeve valve in each cylinder, a member disposed between the cylinders and supported on the cylinder block, an operative connection between the member and the sleeves for operating the latter from the former, and means supported on the cylinder block for operating said member.

3. A multi-cylinder fluid pressure engine of the sleeve valve type including in combination a cylinder block having a pair of cylinders formed therein, a sleeve valve in each cylinder, a member disposed between the cylinders and supported on the cylinder block, an operative connection between the member and the sleeves for operating the latter from the former, a shaft supported on the cylinder block for operating said member, and a driving connection between said shaft and the engine crank shaft.

4. In a multi-cylinder fluid pressure engine of the sleeve valve type having a crank shaft, a crank case and a cylinder block, the combination with a sleeve valve in each cylinder, of operating means for said valves supported on said block, a driving shaft for said operating means supported on said block, and means adapted to drivingly connect said driving shaft and said crank shaft in one predetermined angular relationship thereof only.

5. In a multi-cylinder fluid pressure engine of the sleeve valve type having a crank shaft, a crank case and a cylinder block, the combination with a sleeve valve in each cylinder, of operating means for the valves in adjacent cylinders disposed between the latter and supported on said block, a driving shaft for said operating means supported on said block, and means adapted to drivingly connect said driving shaft and said crank shaft in one predetermined angular relationship thereof only.

In testimony whereof I have signed my name to this specification.

HARRY RALPH RICARDO.